(12) United States Patent
He et al.

(10) Patent No.: US 10,628,528 B2
(45) Date of Patent: Apr. 21, 2020

(54) SYSTEM AND METHOD FOR DOMAIN-INDEPENDENT ASPECT LEVEL SENTIMENT DETECTION

(71) Applicant: Robert Bosch GmbH, Stuttgart (DE)

(72) Inventors: Yifan He, Sunnyvale, CA (US); Lin Zhao, Sunnyvale, CA (US); Kui Xu, Sunnyvale, CA (US); Zhe Feng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 137 days.

(21) Appl. No.: 16/016,106

(22) Filed: Jun. 22, 2018

(65) Prior Publication Data

US 2019/0005027 A1 Jan. 3, 2019

Related U.S. Application Data

(60) Provisional application No. 62/526,398, filed on Jun. 29, 2017.

(51) Int. Cl.
*G06F 17/27* (2006.01)
*G06N 5/00* (2006.01)
(Continued)

(52) U.S. Cl.
CPC ........ *G06F 17/2785* (2013.01); *G06F 17/279* (2013.01); *G06F 17/28* (2013.01);
(Continued)

(58) Field of Classification Search
CPC .... G06F 17/2785; G06F 17/279; G06F 17/28; G06N 20/00; G06N 5/003; G06Q 30/0201; G06Q 50/01
See application file for complete search history.

(56) References Cited

U.S. PATENT DOCUMENTS 7,996,210 B2 8/2011 Godbole et al.
8,356,025 B2 1/2013 Cai et al.
(Continued)

FOREIGN PATENT DOCUMENTS

CN 105955959 A 9/2016

OTHER PUBLICATIONS

Sentiment Analysis and Opinion Mining: A Survey, G.Vinodhini RM.Chandrasekaran, vol. 2, Issue 6, Jun. 2012.*
(Continued)

*Primary Examiner* — Mohammad K Islam
(74) *Attorney, Agent, or Firm* — Maginot, Moore & Beck LLP

(57) ABSTRACT

A method for automated aspect-based sentiment analysis includes parsing reviews from a first domain to generate rhetorical structure trees and extracting rhetorical rules from the rhetorical structure trees, each rhetorical rule including a path extracted from at least one span in at least one of the rhetorical structure trees associated with a probability that the path corresponds to a positive or negative sentiment based on annotation data. The method further includes parsing reviews from a second domain to generate a second plurality of rhetorical structure trees, generating training data that associates at least one aspect in the review from the second domain with a sentiment associated with a rhetorical rule in the plurality of rhetorical rules, and training a classifier to identify sentiments in reviews from the second domain using the second plurality of reviews and the training data.

14 Claims, 3 Drawing Sheets

(51) Int. Cl.
  *G06N 20/00* (2019.01)
  *G06F 17/28* (2006.01)
  *G06Q 30/02* (2012.01)
  *G06Q 50/00* (2012.01)
(52) U.S. Cl.
  CPC ............. *G06N 5/003* (2013.01); *G06N 20/00* (2019.01); *G06Q 30/0201* (2013.01); *G06Q 50/01* (2013.01)

(56) References Cited

U.S. PATENT DOCUMENTS

| | | | |
|---|---|---|---|
| 8,799,773 | B2 | 8/2014 | Reis et al. |
| 8,949,211 | B2 | 2/2015 | Lu et al. |
| 9,483,730 | B2 | 11/2016 | Di Fabbrizio et al. |
| 2006/0069589 | A1 | 3/2006 | Nigam et al. |
| 2009/0248399 | A1* | 10/2009 | Au .................... G06F 17/27 704/9 |
| 2009/0306967 | A1 | 12/2009 | Nicolov et al. |
| 2009/0319342 | A1 | 12/2009 | Stillman et al. |
| 2012/0166180 | A1* | 6/2012 | Au .................... G06F 17/274 704/9 |
| 2012/0254333 | A1* | 10/2012 | Chandramouli ........ G06F 17/27 709/206 |
| 2014/0067370 | A1 | 3/2014 | Brun |
| 2015/0149461 | A1* | 5/2015 | Aguilar Lemarroy ...................... G06F 16/35 707/737 |
| 2019/0332619 | A1* | 10/2019 | De Sousa Webber ...................... G06K 9/6249 |

OTHER PUBLICATIONS

A Hierarchical Model of Reviews for Aspect-based Sentiment Analysis, Sebastian Ruder, Parsa Ghaffari, and John G. Breslin, Sep. 2016.*

Mann, William C. et al., "Rhetorical Structure Theory," retrieved from internet: http://www.sfu.ca/rst/01intro/intro.html, accessed Jun. 29, 2017 (4 pages).

Nigam, Kamal et al., "Using Maximum Entropy for Text Classification," in proceedings of Sixteenth International Joint Conference on Artificial Intelligence, IJCAI-99, 1999 (7 pages).

International Search Report corresponding to International Patent Application No. PCT/EP2018/067085 (5 pages).

Hogenboom, A. et al., "Using Rhetorical Structure in Sentiment Analysis," Publication Communications of the ACM (CACM) 2015 (10 pages).

Somasundaran, S. et al., "Supervised and Unsupervised Methods in Employing Discourse Relations for Improving Opinion Polarity Classification," Proceedings of 2009 Conference on Empirical Methods in Natural Language Processing, 2009 (10 pages).

Wang, F. et al., "Exploiting Discourse Relations for Sentiment Analysis," Proceedings of COLING, 2012 (9 pages).

Bhatia, P. et al., "Better Document-level Sentiment Analysis from RST Discourse Parsing," Empirical Methods in Natural Language, 2015, retrieved from Internet: https://arxiv.org/abs/1509.01599 (7 pages).

* cited by examiner

SYSTEM AND METHOD FOR DOMAIN-INDEPENDENT ASPECT LEVEL SENTIMENT DETECTION

CLAIM OF PRIORITY

This application claims the benefit of U.S. Provisional Application No. 62/526,398, which is entitled "System And Method For Domain-Independent Aspect Level Sentiment Detection," and was filed on Jun. 29, 2017, the entire contents of which are expressly incorporated herein by reference.

FIELD

This disclosure relates generally to the fields of natural language processing (NLP), sentiment analysis, and human machine interaction (HMI) and, more specifically, to methods and systems for the automated generation of trained sentiment analysis models for a domain without requiring manual annotation of a training set in that domain.

BACKGROUND

Automated sentiment analysis systems enable computerized systems to process large volumes of human-generated information, such as online product reviews and social media posts, to understand consumer needs, sketch marketing strategies, and identify potential areas of improvement. This is especially true for aspect-level sentiment analysis, which detects user opinions on each aspect of a product or service. Compared to review level sentiment analysis, aspect-level system can provide more detailed information for market analysis. For example: a review-level sentiment analysis system can summarize from online user reviews that users like a particular drill driver, but an aspect-level system will report that users express a positive sentiment toward the drill driver because it is powerful, but further suggest that the sentiment can be improved if the drill driver were to have a longer battery life.

In practice, aspect-level sentiment analysis systems usually first detect aspects in user reviews with a predefined ontology which contains the common aspects of a product (e.g., power, price, battery, etc.), and then try to predict the reviewers' sentiment polarity towards these aspects. The term "sentiment polarity" indicates that reviewers have a "positive" sentiment for a particular aspect of the product that indicates a preference in favor of the product while a negative polarity indicates a preference against the aspect of the product. In aspect sentiment analysis, a single reviewer may express sentiments with a positive polarity towards some aspects of a product while expressing sentiments with a negative polarity towards other aspects of the product.

While some forms of aspect sentiment analysis are known to the art, the present systems require a great deal of human effort to classify or "annotate" a large body of reviews for products in a particular domain to enable a machine-learning process to produce a sentiment analysis model that is then used in an automated aspect-level sentiment analysis system. In the prior art, the manual annotation process must be repeated for specific sets of training data that apply to a specific domain. For example, a training data set for one domain includes manually annotated data that contain sentiments of users towards restaurants, which enables a machine learning process to generate a sentiment analysis model to evaluate the positive or negative sentiments towards specific aspects of additional restaurant reviews. However, to generate another sentiment analysis model in a different domain, such as consumer electronics, the annotated training data pertaining to the restaurant domain do not provide relevant information that produces a useful aspect-level model to identify the sentiments towards consumer electronics. Instead, the same manual annotation process must be applied to a large set of reviews that are relevant to the domain of consumer electronics to provide training data to generate a useful sentiment analysis model for the consumer electronics domain. Given these drawbacks of the prior art, improvements to sentiment analysis systems and methods that reduce the requirements for human annotation to generate trained sentiment analysis models would be beneficial.

SUMMARY

This disclosure describes a computing system and methodology for detecting aspect level user opinion across domains with high precision. The system starts with a collection component that collects user reviews from the web and a sentiment classifier on a known domain. The system then extracts domain-independent rhetorical structure rules from the known domain, and these rules can be applied to new domains to automatically train aspect-level sentiment detection systems. The output of the trained system is filtered by rhetorical structure rules again to achieve high precision. The final system can be used to generate fine-grained aspect-level sentiment reports for any domain without the requirement for extensive domain-specific annotation by human users as is required in the prior art.

The combination of the overall rating of a review and the sequence of its rhetorical relationships serves as an indicator of the sentiment polarities of each text span inside the review: a series of joint-elaborate relationships in a highly positive (e.g. "5-star") review indicates positive sentiment towards the text span, no matter whether the review talks two different domains, such as consumer electronics in one domain (e.g. a laptop computer review) or a restaurant review in another domain. On the other hand, even reviews that express a strong positive or negative sentiment often contain text spans that involve an "enablement relation", which expresses purpose of the reviewer but seldom has a positive or negative polarity. For example, in the statement "Don't feel like having anything heavy for dinner," the author does not express any specific positive or negative sentiment towards a restaurant. Although the sentence is selected from a highly positive review, this particular span of text provides little indication of the sentiment of the reviewer towards any specific aspects of the restaurant. The systems and methods described herein use rhetorical rules to distinguish text spans that express sentiment polarity from those spans without sentiments. The systems and methods use the former spans to automatically construct a training set for aspect sentiment detection systems without requiring manual annotation of a different set of training data for each domain.

One embodiment of a system described herein enables aspect-level sentiment analysis with high precision using the rhetorical structure of user reviews. The system includes a user review collection component, an aspect detection component, a domain specific aspect-level sentiment detection component, a rhetorical structure parsing component, a rhetorical rule extraction component, and a domain-independent aspect sentiment prediction component.

In one embodiment, a method for automated sentiment analysis has been developed. The method includes receiving, with a network interface device in a server, a first plurality of reviews from a first domain, each review in the first plurality of reviews being associated with annotation data that identify a plurality of sentiments and a plurality of aspects included in the first plurality of reviews, parsing, with a processor in the server, the first plurality of reviews from the first domain to generate a first plurality of rhetorical structure trees, each rhetorical structure tree in the first plurality of rhetorical structure trees corresponding to one review in the first plurality of reviews and each rhetorical structure tree in the first plurality of rhetorical structure trees including at least one span associated with a predetermined relationship, extracting, with the processor in the server, a plurality of rhetorical rules from the first plurality of rhetorical structure trees, each rhetorical rule including a path extracted from at least one span in at least one of the first plurality of rhetorical structure trees associated with a probability that the path corresponds to a positive or negative sentiment based on the annotation data, receiving, with the network interface device in the server, a second plurality of reviews from a second domain that is different from the first domain, the second plurality of reviews including no annotation data, parsing, with the processor in the server, the second plurality of reviews from the second domain to generate a second plurality of rhetorical structure trees, each rhetorical structure tree in the second plurality of rhetorical structure trees corresponding to one review in the second plurality of reviews, each rhetorical structure tree in the second plurality of rhetorical structure trees including at least one span associated with the predetermined relationship, generating, with the processor in the server, training data that associates at least one aspect in the review in the second plurality of reviews with a sentiment associated with a rhetorical rule in the plurality of rhetorical rules in response to a path extracted from the rhetorical structure tree including the at least one aspect in the review in the second plurality of reviews matching the path of the rhetorical rule, and training, with the processor in the server, a classifier to identify sentiments in reviews from the second domain using the second plurality of reviews and the training data.

In a further embodiment, the method includes extracting, with the processor in the server, a plurality of paths from the first plurality of rhetorical structure trees, each path in the plurality of paths including at least one span that contains an aspect.

In a further embodiment, the method includes receiving, with the network interface device in the server, a third plurality of reviews from the second domain, identifying, with the processor in the server, a plurality of sentiments for at least one aspect that is included in the third plurality of reviews based on an output of the classifier, and generating, with the processor in the server, an output including an aspect-level sentiment report that identifies an aggregate sentiment level for the at least one aspect in the third plurality of reviews.

In a further embodiment, the method includes parsing, with the processor in the server, the third plurality of reviews from the second domain to generate a third plurality of rhetorical structure trees, each rhetorical structure tree in the third plurality of rhetorical structure trees corresponding to one review in the third plurality of reviews, each rhetorical structure tree in the third plurality of rhetorical structure trees including at least one span associated with the predetermined relationship, and filtering, with the processor in the server, the output of the classifier to remove a sentiment corresponding to an aspect in one review in the third plurality of reviews with a path in the rhetorical tree that corresponds to a rhetorical rule that has a probability of the sentiment identified for the one review being less than a predetermined threshold.

In a further embodiment, the method includes identifying, with the processor in the server, a predetermined relationship for at least one span in a rhetorical structure tree in the plurality of rhetorical structure trees as a joint relationship, a concession relationship, an elaboration relationship, or an enablement relationship.

In a further embodiment, the method includes identifying the joint relationship in the at least one span that further includes at least two spans in the rhetorical structure tree.

In a further embodiment, the method includes training the classifier for the second domain wherein the classifier for the second domain is a maximum entropy classifier.

In another embodiment, a system for automated sentiment analysis has been developed. The system includes a network interface device, a memory, and a processor operatively connected to the network interface device and the memory. The processor is configured to receive a first plurality of reviews from a first domain using the network interface device, each review in the first plurality of reviews being associated with annotation data that identify a plurality of sentiments and a plurality of aspects included in the first plurality of reviews, parse the first plurality of reviews from the first domain to generate a first plurality of rhetorical structure trees, each rhetorical structure tree in the first plurality of rhetorical structure trees corresponding to one review in the first plurality of reviews and each rhetorical structure tree in the first plurality of rhetorical structure trees including at least one span associated with a predetermined relationship, extract a plurality of rhetorical rules from the first plurality of rhetorical structure trees, each rhetorical rule including a path extracted from at least one span in at least one of the first plurality of rhetorical structure trees associated with a probability that the path corresponds to a positive or negative sentiment based on the annotation data, receive a second plurality of reviews from a second domain that is different from the first domain using the network interface device, the second plurality of reviews including no annotation data, parse the second plurality of reviews from the second domain to generate a second plurality of rhetorical structure trees, each rhetorical structure tree in the second plurality of rhetorical structure trees corresponding to one review in the second plurality of reviews, each rhetorical structure tree in the second plurality of rhetorical structure trees including at least one span associated with the predetermined relationship, generate training data that associates at least one review in the second plurality of reviews with a sentiment associated with a rhetorical rule in the plurality of rhetorical rules in response to a path extracted from the rhetorical structure tree corresponding to the at least one review in the second plurality of reviews matching the path of the rhetorical rule, and train a classifier to identify sentiments and aspects in reviews from the second domain using the second plurality of reviews and the training data, the classifier being stored in the memory for use in classifying sentiments and aspects for additional reviews in the second domain.

In a further embodiment of the system, the processor is configured to extract a plurality of paths from the first plurality of rhetorical structure trees, each path in the plurality of paths including at least one span.

In a further embodiment of the system, the processor is configured to receive a third plurality of reviews from the second domain using the network interface device, identify a plurality of sentiments for at least one aspect that is included in the third plurality of reviews based on an output of the classifier, and generate an output using the network interface device including an aspect-level sentiment report that identifies an aggregate sentiment level for the at least one aspect in the third plurality of reviews.

In a further embodiment of the system, the processor is configured to parse the third plurality of reviews from the second domain to generate a third plurality of rhetorical structure trees, each rhetorical structure tree in the third plurality of rhetorical structure trees corresponding to one review in the third plurality of reviews, each rhetorical structure tree in the third plurality of rhetorical structure trees including at least one span associated with the predetermined relationship, and filter the output of the classifier to remove a sentiment corresponding to one review in the third plurality of reviews with a path in the rhetorical tree that corresponds to a rhetorical rule that has a probability of the sentiment identified for the one review that is less than a predetermined threshold.

In a further embodiment of the system, the processor is configured to identify a predetermined relationship for at least one span in a rhetorical structure tree in the plurality of rhetorical structure trees as a joint relationship, a concession relationship, an elaboration relationship, or an enablement relationship.

In a further embodiment of the system, the processor is configured to identify the joint relationship in the at least one span that further includes at least two spans in the rhetorical structure tree.

In a further embodiment of the system, the classifier for the second domain is a maximum entropy classifier.

DETAILED DESCRIPTION

Figure 1:
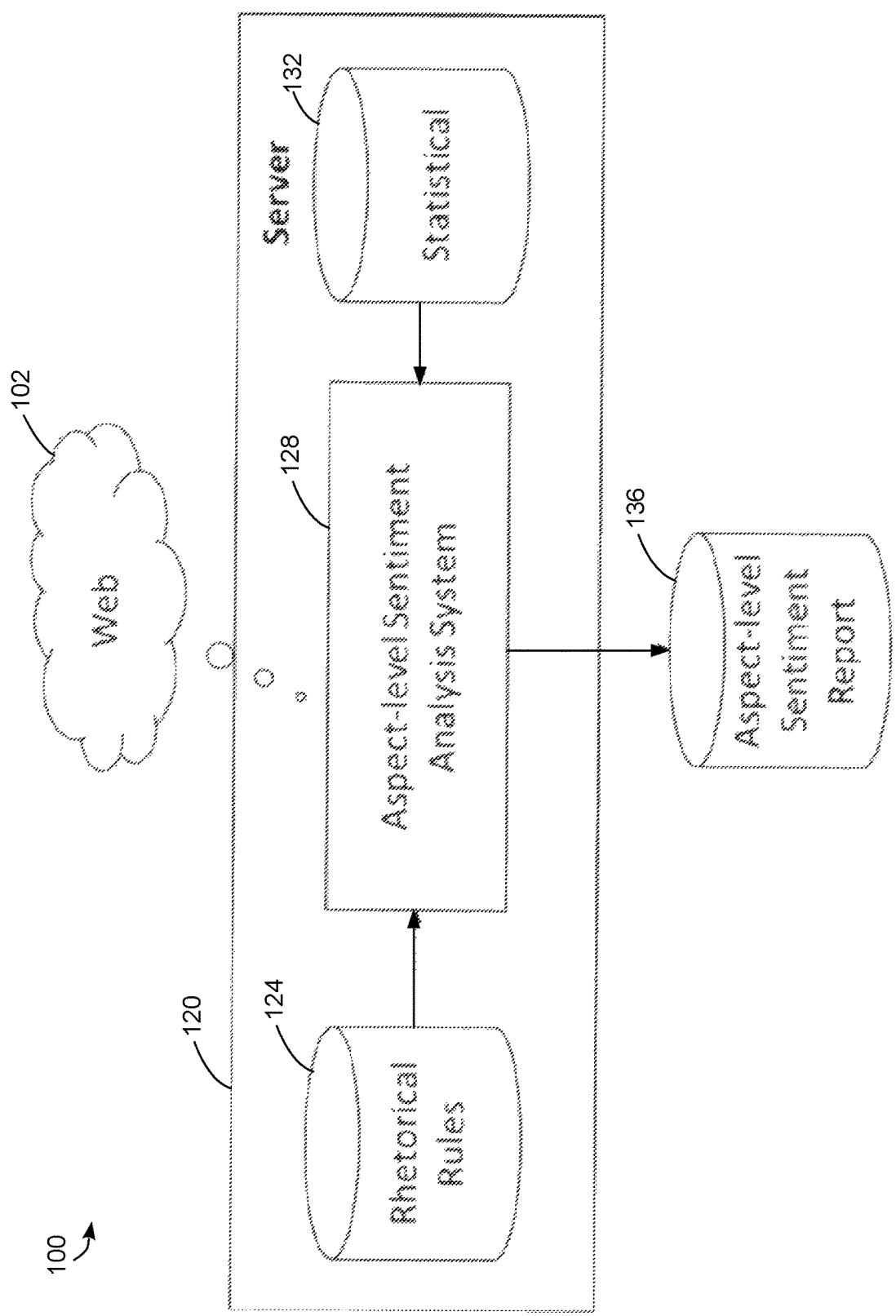
FIG. 1 is a schematic diagram of a sentiment analysis system embodiment.

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

As described herein, the term "rhetorical structure" refers to an organization for the structure of a body of text that is generated automatically using a set of predetermined relationships that are assigned to one or more spans of text, where each "span" refers to a component such as a clause, phrase, sentence, or paragraph within the text. In the context of this disclosure, the text is typically a review of a product or service that may express sentiments about aspects of the product or service. For example, a text span may elaborate on another span (the Elaboration relation: e.g. "The drill is powerful; it can handle all household tasks"), offer a concession to another span (the Concession relation: e.g. "Although the drill is powerful, I hope the battery would last longer"), talk about the same topic together with another span (the Joint relation: "The drill is powerful. The price is good"), or explain the purpose of an action (the Enablement relation: "We bought the bits for our new drill"). The rhetorical structure defines a hierarchy of relationships where each relationship links two text spans and some more complex rhetorical structures also include links between multiple relationships to form a larger tree structure. Sometimes the relationships have equal priority in the hierarchy, which sometimes one relationship (nucleus) is more important than another relationship (satellite). The "Elaboration" relationship is the relationship in which the satellite span provides additional information to the nucleus span. The "Joint" relationship refers a relationship that covers two equal text spans about the same topic. The "Concession" relationship is the relationship in which the satellite seems to be inconsistent with the nucleus, but both the nucleus and the satellite are affirmed by the author. The embodiments presented herein produce the rhetorical structures using a tree structure to enable use of the rhetorical structures in cross-domain sentiment analysis.

The embodiments described herein describe automated systems that analyze the sentiments that are expressed towards different aspects of products or services in different domains. As used herein, the term "sentiment" refers to a machine-quantifiable attribute that denotes a view or attitude of an author. In general a sentiment expresses a positive or negative attitude on the part of the author, although the degree to which a sentiment has a positive or negative sentiment polarity may vary and in some instances a sentiment may express ambivalence. As described in further detail below, rhetorical rules associate a probability score value of different rhetorical structures with positive or negative sentiments. As used herein, the term "aspect" refers to a word or phrase that identifies a particular part or feature of the subject of a text statement, where one example of a text statement is a review of a product or service. As noted above, non-limiting examples of aspects that are addressed in reviews include aspects such as the "price" and "shipping time". In some instances, a single review identifies multiple aspects of a product or service and includes information that expresses different sentiments towards different aspects of the same product or service. As used herein, the term "domain" refers to a category of product or service for which an automated system receives multiple reviews. One domain could be, for example, reviews of restaurants while another domain could be reviews of a type of power tool such as a drill.

FIG. 1 depicts a sentiment analysis system 100. The sentiment analysis system 100 includes a server 120. The server 120 includes at least one processor that is operatively connected to a memory and a network interface device. The processor includes one or more central processing units (CPUs) or other suitable digital logic devices that implement the functions of the sentiment analysis described herein by executing stored program instructions that are stored in the memory. The memory stores both the programmed instructions for execution by the processor as well as review data, training data, trained classifiers, rhetorical rules, databases that store aspects for one or more domains, and any other data that are required to implement the sentiment analysis system 100. The network interface device serves as an input device that enables the sentiment analysis system 100 to receive reviews from one or more domains and an output device that enables the sentiment analysis system 100 to produce fine-grained aspect-level sentiment reports.

During operation, the server 120 receives review data from at least one online information source such as one or more sites on the world-wide web (WWW) 102 or another online information source such as a social network service, short message service (SMS) messages, electronic mail services, and any other suitable online information source. Each review includes text and at least some, but not necessarily all, reviews include text that expresses a sentiment about one aspect of a product or service in a given domain. The server 120 receives the information via a data network such as a local area network or a wide area network. The server 120 includes at least one digital processing device such as a central processing unit (CPU) or other suitable digital processing hardware that executes stored program instructions to perform the automated aspect-level sentiment analysis operations described herein. In some embodiments, the server 120 is formed from a cluster of multiple computing devices. In the embodiment of FIG. 1, the server 120 executes stored program instructions to implement an aspect-level sentiment analysis system 128. The aspect-level sentiment analysis system 128 uses a database of rhetorical rules 124 to identify the rhetorical structure of different spans of text in each review that is received from the web 102. As described in further detail below, the sentiment analysis system 128 uses the rhetorical rules 124 to identify statements in each review with positive and negative sentiment polarities in a domain-independent manner.

The server 120 also includes a statistical aspect detection database 132 that the aspect-level sentiment analysis system 128 uses to identify different aspects of the product in user reviews. The statistical aspect detection database 132 is, for example, a string matcher that operates based on a user-defined aspect dictionary or a machine learning-based statistical tagger that is trained to detect aspects in text using human annotated data. As is described in further detail below, the aspect-level sentiment analysis system 128 uses the domain-independent rhetorical rules 124 to detect the positive, negative, or neutral user sentiments in review data and the sentiment analysis system 128 uses the statistical aspect detection database 132 to identify the specific aspects of a product to which the sentiments are directed. In the embodiment of FIG. 1, the aspect detection database 132 stores sets of aspects that correspond both to a first "seed" domain for which human annotations are available to identify sentiments as well as aspects for a second domain that does not include human annotation data. The embodiments described herein enable the system 100 to generate a set of rhetorical rules 124 that are generic to multiple domains and to train a classifier in the aspect-level sentiment analysis system 128 to identify the sentiments that are expressed in multiple user reviews of products in a particular domain to produce an aspect-level sentiment report 136 without requiring human annotation data to be available for the particular domain. The aspect-level sentiment report 136 provides information about positive, negative, or neutral sentiments of the reviewers (typically an aggregate sentiment level from a large number of reviews) towards various aspects of the product. In one embodiment, the aspect-level sentiment report 136 includes two categories of information. First, the aspect-level sentiment report includes aggregated opinions towards a product: e.g. 75% of the users are happy with the power. Second, the aspect-level sentiment report includes sorted examples of user comments: For each aspect, the system 100 extracts positive and negative comments (the extracted comments are sentences, so that the analyst does not have to read the whole review) from online reviews for the analyst to browse through.

Figure 2:
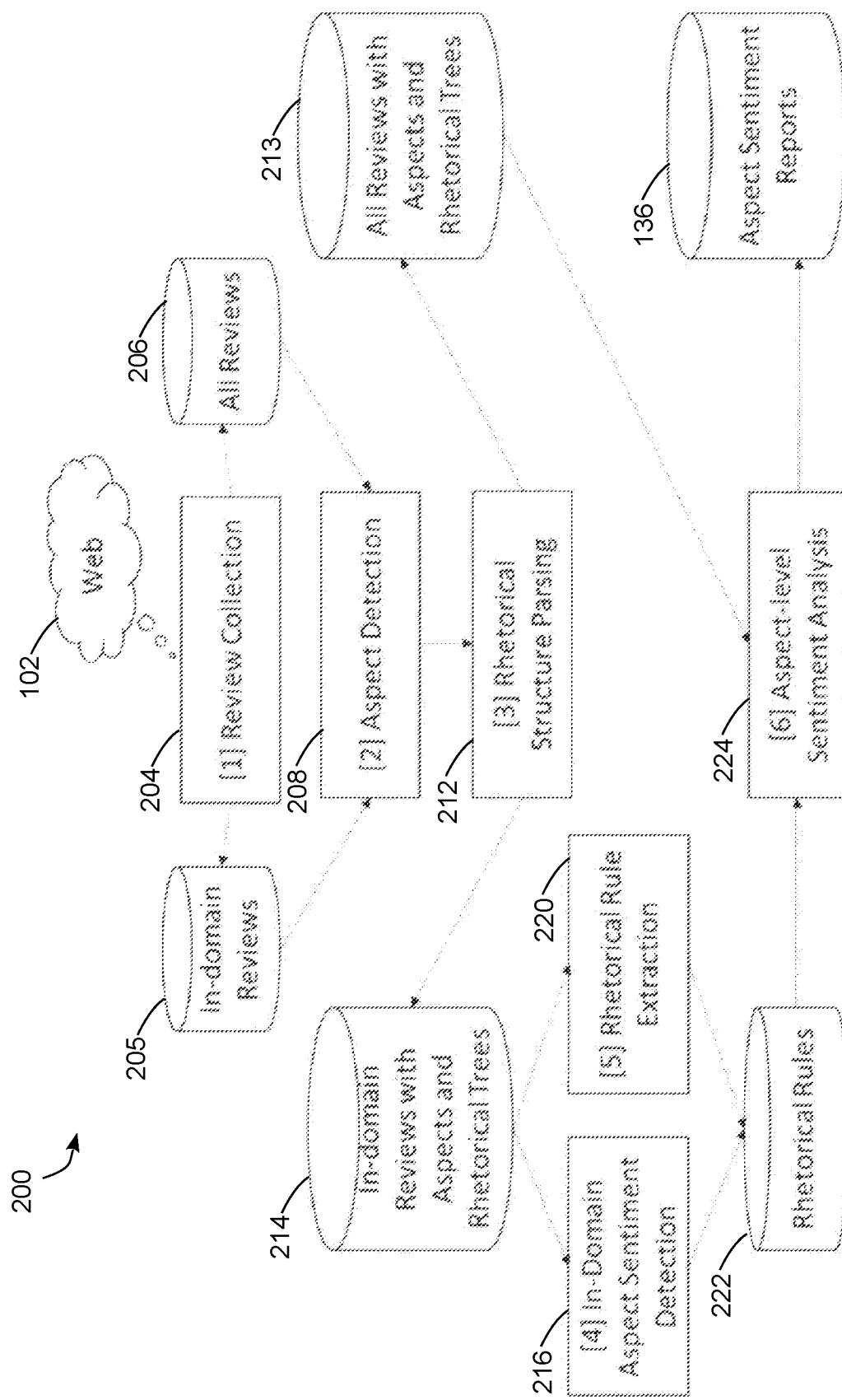
FIG. 2 is a diagram of a process for training a sentiment analysis model using the system of FIG. 1.

FIG. 2 depicts a process 200 for operation of the system 100 of FIG. 1 in additional detail. During the process 200, the server 120 in the system 100 performs review collection (block 204) to receive product review data from the web 102 or other suitable online information sources. The system 100 receives at least one review, although in some practical embodiments the system 100 receives a large number of reviews to produce an aspect-level sentiment analysis that reflects the aggregate sentiments taken from a large number of reviews. The review collection 204 collects and stores user reviews, ratings associated with the reviews, and product information from the web 102. The review collection 204 serves two purposes. The first purpose is to collect in-domain reviews 205, which are reviews in the same domain as the one used in the in-domain system. These reviews are later processed by the rhetorical rule extraction component to extract rhetorical structure rules for aspect sentiment prediction. The second purpose is to collect reviews from other domains (all reviews 206), which are the input of the final system.

The process 200 continues with the generation of a general aspect detection model (block 208). Aspects are the targets in the aspect sentiment detection task. The server 120 in the system 100 includes the aspect detection database 132 component that identifies the aspects in user reviews. The aspect detection database 132 can either be a string matcher based on a user-defined aspect dictionary or a machine learning-based statistical tagger trained on human annotated data. For example, given a sentence "It has a low price and fast shipping", this component detects two aspects, "price" and "shipping". As described above, the system 100 generates the aspect detection database 132 with sets of aspects for both the seed domain and a new domain for which there is no annotation data available. In many instances, the seed domain and the new domain include some common aspects and some aspects that are unique to each domain.

Figure 3A:
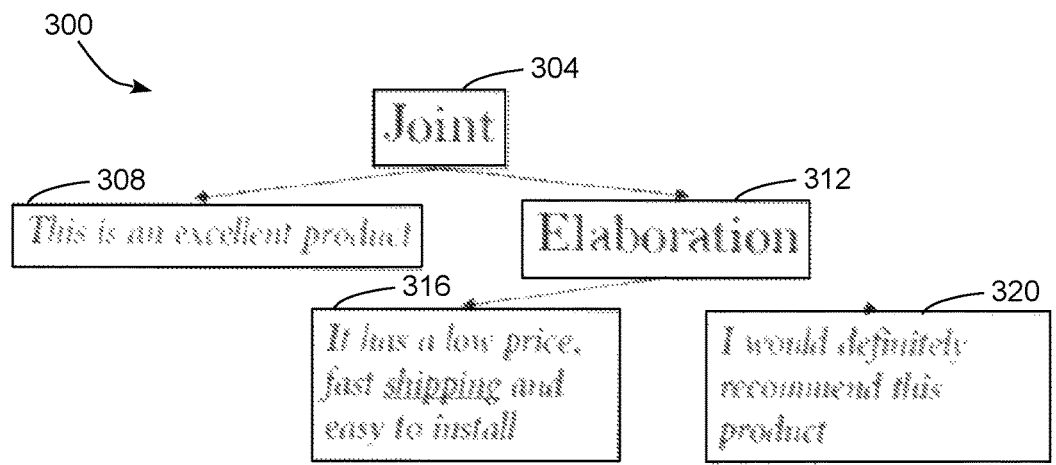
FIG. 3A is a diagram that depicts the structure of a rhetorical structure tree for a sample text span contained in a review.

In addition to detecting different aspects from the review data, the system 100 performs rhetorical structure processing (block 212) to generate domain-independent rhetorical structures that indicate both positive and negative sentiments in the reviews for different aspects of each product. The rhetorical structure parsing component parses an input document into a rhetorical structure tree: a tree of text spans within the document and predetermined relationships between these text spans. For example, this component will take following review data: "This is an excellent product. It has a low price, fast shipping and easy to install. I would definitely recommend this product." and generate a rhetorical structure tree including the first tree 300 of FIG. 3A. In FIG. 3A the rhetorical structure tree 300 includes a "joint" relationship element 304 between the first text span, which is the sentence "This is an excellent product." 308 in the tree 300, and a further "elaboration" element 312 that joins together the sentences "It has a low price, fast shipping, and easy to install." 316 and "I would definitely recommend this product." 320.

The process 200 continues with training for an in-domain aspect detection model (block 216) that is trained using the in-domain reviews and detected aspects and rhetorical structure trees for the predetermined "in-domain" data 214. The system 100 trains a domain-specific aspect sentiment detection system using human annotated data for a seed domain based on the "in-domain" data 205 for a predetermined domain. For example, in one embodiment the predetermined in-domain refers to reviews for consumer electronics. The goal here is to build a seed system for the next steps, instead of building a general system that is capable of operating in multiple domains. The general system is not limited to the domain that is selected for the in-domain, such as an aspect-level sentiment system that addresses the domain of restaurant reviews.

The in-domain system can be trained using a Maximum Entropy classifier on a domain that already has aspect-level sentiment annotation data. A very small number of domains, such as restaurant reviews, already have annotated data publicly available that enable building of an in-domain system. In the example of "It has a low price and fast shipping", this component will detect that the user holds a positive opinion towards "shipping" and "price". The training process for the "in-domain" based on a tagged and annotated set of in-domain review data 205 is otherwise known to the art and is not discussed in further detail herein.

During the process 200, the system 100 also performs a rhetorical rule extraction process (block 220) to generate a set of rhetorical structure trees that can be used to identify positive and negative sentiment polarities in a wide range of domains other than the predetermined in-domain data. The rhetorical rule extraction process extracts rhetorical paths that occur in at least one of the in-domain rhetorical structure trees where at least one span in the path that is extracted from each rhetorical structure tree includes an in-domain aspect. The rule extraction process scores these rules by their probability of occurrence in positive/negative sentiment expressions, where the sentiments are identified using the in-domain annotation data. The input is the in-domain user reviews collected by the user review collection component and then processed by the aspect detection component and the in-domain system. In other words, the input of this component is user reviews with aspects and their associated sentiments detected.

For each aspect, this component extracts the path from the root node to the span that subsumes the current aspect: e.g. for the tree 300 of FIG. 3A, the path extracted for the aspect "shipping" is 5.0_JOINT-ELABORATION (Note that 5.0 is the user assigned rating of the review on a scale of 0.0 to 5.0, although other ratings scales may be used in other embodiments). For each extracted path, the system 100 generates a score based on the probability that the extracted path corresponds to a positive or a negative opinion. The paths with their associated positive and negative probabilities are called rhetorical rules. These rules are extracted from a known domain, but can be used to identify or filter aspect sentiments in new domains. These rules make the system 100 domain-independent: it is built from a specific domain, but is no longer domain-specific once built, and can thus be applied to any domain without additional human annotation.

Figure 3B:
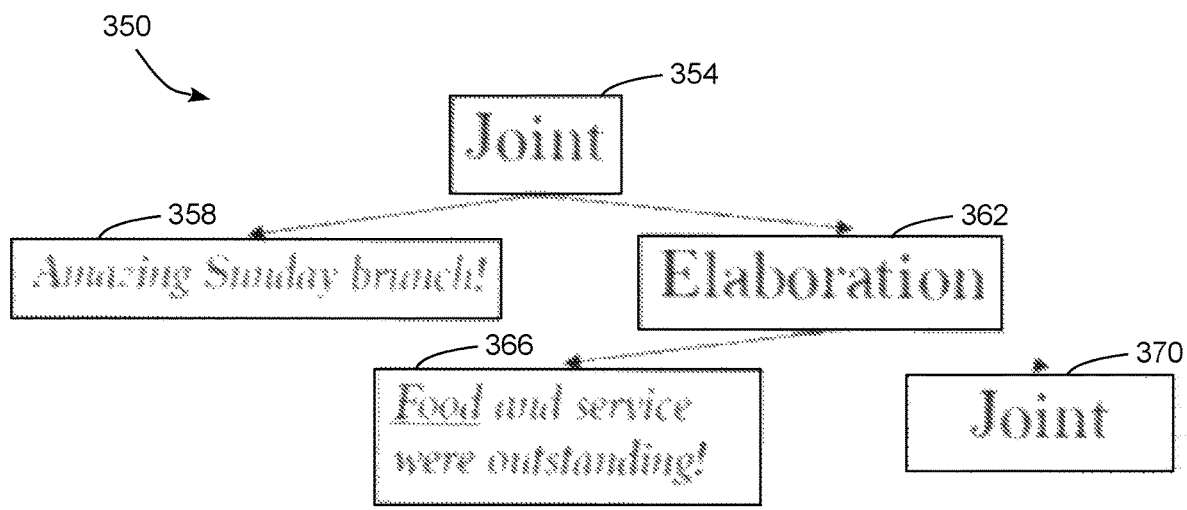
FIG. 3B is a diagram that depicts the structure of another rhetorical structure tree for another sample text span contained in a review from a different domain than that of FIG. 3A.

To illustrate the domain independence of the system 100, FIG. 3B depicts an example of another rhetorical structure tree for the new domain that covers restaurant reviews. In FIG. 3B, the review includes the text "Amazing Sunday brunch! Food and service were outstanding!" The rhetorical structure tree 350 includes a joint relationship 354 between the text span for "Amazing Sunday Brunch!" 358 and an elaboration relationship 362 for the text span "Food and service were outstanding!" 366 with another joint relationship 370. As in the rhetorical structure tree 300, the tree 350 identifies the positive sentiment in the text span 358 and uses the elaboration element to link the broader aspect of a restaurant ("Sunday brunch") with the elaborations of the more specific "food" and "service" aspects.

During the process 200, the server 120 in the system 100 uses the in-domain aspect sentiment data and the extracted rhetorical rules from the in-domain model to generate a set of domain-independent rhetorical rules 222 that the server 120 stores as the rhetorical rules 124 in the embodiment of FIG. 1. The sentiment prediction component uses rhetorical rules to collect training data for new domains and filter system predictions (block 224). To train the aspect sentiment analysis system on a new domain, the system 100 first collects user reviews in the new domain. In one embodiment, the network interface device in the server 120 receives a second plurality of reviews from a new, second, domain that are different from the first seed domain, such as additional reviews that are received from the web 102 or another online information source. The second plurality of reviews comes from a second domain that does not include annotations that could identify the sentiments of the reviews. The server 120 then identifies any of the reviews that include at least one aspect using the aspect detection database 132 to identify aspect words and phrases in the text of the reviews of the second domain.

The server 120 processes reviews that include at least one aspect to parse the second plurality of reviews from the new domain to generate another plurality of rhetorical structure trees for the reviews in the second domain in the same manner as the parsing that generates the rhetorical structure trees for the seed domain. The server 120 identifies the path for any span that includes a detected aspect using the aspect detection database 132 and matches the path to any of the rhetorical rules 124 that include the same path to enable the server 120 to identify spans of text in reviews of the second domain that both include an aspect and that match a rhetorical rule to assign a probability score that the sentiment expressed for the aspect is either a positive or negative polarity sentiment.

The server 120 performs this process on each of the reviews received for the second domain to generate a set of training data that associates some of the spans of text in the rhetorical structure trees of the second plurality of reviews with at least one aspect contained in the span and to the probability score for a sentiment that is expressed in the path of the rhetorical structure tree for each review in the second domain. The server 120 also ignores spans of text in the rhetorical tree structures of the second plurality of reviews that either do not include an aspect for the second domain or that have paths that do not match the paths for any of the rhetorical rules, which enables the system 100 to ignore text in the second plurality of reviews that would not be useful in identifying the sentiments for specific aspects in the second domain.

In one example of the process 200, the system 100 receives a review text: "The product is good. It is easy to use and the shipping is fast". The server 120 uses the aspect detection database 132 to identify the aspect "shipping". The server 120 parses the text into a rhetorical structure tree and matches a rhetorical rule path ("5.0_JOINT-ELABORATION") and its probability score (high positive probability) with the path of the rhetorical structure tree that includes the "shipping" aspect. The server 120 generates training data with an annotation that the path from the rhetorical structure tree of the review associated with the "shipping" aspect has a positive sentiment with the probability score value of the rhetorical rule. In this way the server 120 automatically generates a positive sentiment label for the aspect "shipping". As described above, the system 100 automatically generates annotation data that maps aspects to sentiments for selected spans of text in the reviews from the second domain without requiring human annotation to identify the sentiments that should be assigned to each aspect in the second plurality of reviews.

The process 200 continues as the server 120 trains a machine-learning classifier in the aspect sentiment analysis system 128 using the reviews and annotation data as training data for the new domain and uses the classifier to identify the sentiments for specific aspects of additional reviews that are received for the new domain (block 224). In one embodiment, the server 120 trains a maximum entropy classifier using the previously collected reviews from the new domain and the annotation data that identify the aspect-sentiment probability relationships that are included in the training data. The server 120 trains the classifier using the spans of text from the rhetorical structure trees in the training data that include each identified aspect using the identified sentiment probabilities to ensure that the classifier generates a correct sentiment analysis output for the sentiments that are included in the training data. Once trained, the maximum entropy classifier in the aspect sentiment analysis system 128 can receive text from a span in a new review that includes one of the aspects stored in the aspect detection database 132 and emit a score indicating the highest estimated likelihood for a positive or negative sentiment polarity that the review expresses towards the aspect. In some embodiments the classifier outputs a binary positive/negative classification while in other embodiments the classifier outputs a score on a continuum ranging from a strongest negative sentiment to a strongest positive sentiment with one or more intermediate levels of negative or positive sentiment between the two extremes. This information enables the system 100 to generate an aspect-level sentiment analysis report for one or more reviews in the new domain.

In the embodiments described herein, the system 100 trains a classifier to improve the accuracy of sentiment detection for each aspect because the classifier also extracts additional latent linguistic features from the text spans in the training data that may not be fully described by the rhetorical rules. Thus, the system 100 uses the rhetorical rules as a mechanism to identify spans of text to use as training data for the different identified aspects, and the training process enables the classifier to extract additional latent features in the text of the training data to improve the accuracy of sentiment detection even if the features are not directly encoded in the rhetorical rules themselves. While the embodiments described herein use a maximum entropy classifier for illustrative purposes, different configurations of the server 120 and the process 200 can use other forms of classifiers that are based on, for example, neural network, hidden Markov model, or support vector machine classifiers using the same training data for the new domain that are generated during the process 200.

Once the classifier in the aspect level sentiment analysis system 128 is trained, the server 120 receives an additional third plurality of reviews in the new domain from the web 102 or other online information sources. The server 120 identifies aspects in the additional review data 213 from the new domain using the aspect detection database 132, parses the reviews to generate rhetorical tree structures with text spans that include the identified aspects and additional text that may express a sentiment towards the aspect, and uses the text span that includes the aspect as input to the trained classifier in the aspect-level sentiment analysis system 128. The trained classifier generates an output that identifies the positive or negative sentiment for the particular aspect in the review. The server 120 uses the trained classifier in the aspect sentiment analysis system 128 to generate the aspect-level sentiment analysis report 136.

After completion of the classifier training process, the server 120 can use the classifier to identify sentiments that are expressed towards aspects in additional reviews from the new domain without directly employing the rhetorical rules 124. However, in some embodiments, the system 100 also filters the output of the classifier using high confidence rhetorical rules 124 to further improve the precision of the predicted sentiment outputs from the classifier in situations where the path in the rhetorical tree structure of the review that contains the aspect matches the corresponding path of a rhetorical rule with a low probability that the sentiment output of the classifier is correct. For example, if the classifier identifies a positive sentiment for an aspect in a review, the server 120 optionally matches the path in the rhetorical structure tree of the review that includes the aspect to the corresponding path of a rhetorical rule 124. If the probability score that is associated with the matching rhetorical rule indicates that the probability of the sentiment being positive is below a predetermined threshold (e.g. less than 40% probability that the sentiment is actually positive), then the server 120 filters (removes) the identified sentiment for the aspect in the review from the final output in the aspect-level sentiment report 136 to improve the accuracy of the aspect-level sentiment report 136. The server 120 retains outputs from the classifier that match rhetorical rules with higher probability values that are above the threshold, which indicate high confidence levels that the output of the classifier is correct.

The final output of the server 120 in the process 200 is organized into an aspect-level sentiment report 136 which summarizes the customer opinions towards a product or service, including the aspects that are liked or disliked, together with the opinions from the original reviews. The server 120 implements a web server, graphical user interface, or other output implementation to display the final aspect-level sentiment report 136.

The process 200 is applicable to any domain where user reviews and associated user ratings are available, which is valid for most product and service reviews. Thus, the system 100 implements a general domain system that can be applied to any domain in which user reviews and associated user ratings are available via the web 102 or any other suitable online information source. The rule collection and training functions of the system are executed offline. The data collection and prediction components can either be run online as a real time system or as an offline analytics system with periodical updates.

The systems and methods described herein include various technological improvements over the prior art. These improvements include, the utilization of rules derived from rhetorical structures of user reviews to detect aspect-level user opinions with high precision, leveraging a large number of user reviews to derive aspect sentiment detection rules in an automated manner without requiring substantial human intervention, and providing an aspect sentiment analysis system that can be applied to multiple domains without requiring a manual training process for each domain. More particularly, the rhetorical structure derived rules for aspect-level sentiment analysis that are described herein provide rhetorical structures are invariant across domains. Thus, the systems and methods described herein are applicable to new domains directly without incurring human annotation effort.

As described herein, the sentiment analysis system 100 and the process 200 provide improvements to the operation of an automated system that can identify the sentiments and specific aspects of user reviews in domains where humans have not provided detailed annotation data for training a classifier. The specific embodiments describe implement rules that improve the accuracy of aspect-based sentiment detection for reviews in new domains without requiring human intervention even though the sentiment detection in the new domains could not be automated in prior-art sentiment analysis systems. Furthermore, the automated extraction of the rhetorical rules and the automated generation of the aspect detection database from a seed domain as part of an automated process that generates training data for a new domain are non-limiting examples of a particular solution to the problem of improving the operation of sentiment analysis systems in domains that lack large sets of human annotation data.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A method for automated sentiment analysis comprising:
   receiving, with a network interface device in a server, a first plurality of reviews from a first domain, each review in the first plurality of reviews being associated with annotation data that identify a plurality of sentiments and a plurality of aspects included in the first plurality of reviews;
   parsing, with a processor in the server, the first plurality of reviews from the first domain to generate a first plurality of rhetorical structure trees, each rhetorical structure tree in the first plurality of rhetorical structure trees corresponding to one review in the first plurality of reviews and each rhetorical structure tree in the first plurality of rhetorical structure trees including at least one span associated with a predetermined relationship;
   extracting, with the processor in the server, a plurality of rhetorical rules from the first plurality of rhetorical structure trees, each rhetorical rule including a path extracted from at least one span in at least one of the first plurality of rhetorical structure trees associated with a probability that the path corresponds to a positive or negative sentiment based on the annotation data;
   receiving, with the network interface device in the server, a second plurality of reviews from a second domain that is different from the first domain, the second plurality of reviews including no annotation data;
   parsing, with the processor in the server, the second plurality of reviews from the second domain to generate a second plurality of rhetorical structure trees, each rhetorical structure tree in the second plurality of rhetorical structure trees corresponding to one review in the second plurality of reviews, each rhetorical structure tree in the second plurality of rhetorical structure trees including at least one span associated with the predetermined relationship;
   generating, with the processor in the server, training data that associates at least one aspect in the review in the second plurality of reviews with a sentiment associated with a rhetorical rule in the plurality of rhetorical rules in response to a path extracted from the rhetorical structure tree including the at least one aspect in the review in the second plurality of reviews matching the path of the rhetorical rule; and
   training, with the processor in the server, a classifier to identify sentiments in reviews from the second domain using the second plurality of reviews and the training data.

2. The method of claim 1, the extracting a plurality of rhetorical rules further comprising:
   extracting, with the processor in the server, a plurality of paths from the first plurality of rhetorical structure trees, each path in the plurality of paths including at least one span that contains an aspect.

3. The method of claim 1 further comprising:
   receiving, with the network interface device in the server, a third plurality of reviews from the second domain;
   identifying, with the processor in the server, a plurality of sentiments for at least one aspect that is included in the third plurality of reviews based on an output of the classifier; and
   generating, with the processor in the server, an output including an aspect-level sentiment report that identifies an aggregate sentiment level for the at least one aspect in the third plurality of reviews.

4. The method of claim 3 further comprising:
   parsing, with the processor in the server, the third plurality of reviews from the second domain to generate a third plurality of rhetorical structure trees, each rhetorical structure tree in the third plurality of rhetorical structure trees corresponding to one review in the third plurality of reviews, each rhetorical structure tree in the third plurality of rhetorical structure trees including at least one span associated with the predetermined relationship; and
   filtering, with the processor in the server, the output of the classifier to remove a sentiment corresponding to an aspect in one review in the third plurality of reviews with a path in the rhetorical tree that corresponds to a rhetorical rule that has a probability of the sentiment identified for the one review being less than a predetermined threshold.

5. The method of claim 1, the parsing further comprising:
   identifying, with the processor in the server, a predetermined relationship for at least one span in a rhetorical structure tree in the plurality of rhetorical structure trees as a joint relationship, a concession relationship, an elaboration relationship, or an enablement relationship.

6. The method of claim 4 the parsing further comprising:
   identifying the joint relationship in the at least one span that further includes at least two spans in the rhetorical structure tree.

7. The method of claim 1 wherein the classifier for the second domain is a maximum entropy classifier.

8. A system for automated sentiment analysis comprising:
   a network interface device;
   a memory; and
   a processor operatively connected to the network interface device and the memory, the processor being configured to:
   receive a first plurality of reviews from a first domain using the network interface device, each review in the first plurality of reviews being associated with annotation data that identify a plurality of sentiments and a plurality of aspects included in the first plurality of reviews;
   parse the first plurality of reviews from the first domain to generate a first plurality of rhetorical structure trees, each rhetorical structure tree in the first plurality of rhetorical structure trees corresponding to one review in the first plurality of reviews and each rhetorical structure tree in the first plurality of rhetorical structure trees including at least one span associated with a predetermined relationship;

extract a plurality of rhetorical rules from the first plurality of rhetorical structure trees, each rhetorical rule including a path extracted from at least one span in at least one of the first plurality of rhetorical structure trees associated with a probability that the path corresponds to a positive or negative sentiment based on the annotation data;

receive a second plurality of reviews from a second domain that is different from the first domain using the network interface device, the second plurality of reviews including no annotation data;

parse the second plurality of reviews from the second domain to generate a second plurality of rhetorical structure trees, each rhetorical structure tree in the second plurality of rhetorical structure trees corresponding to one review in the second plurality of reviews, each rhetorical structure tree in the second plurality of rhetorical structure trees including at least one span associated with the predetermined relationship;

generate training data that associates at least one review in the second plurality of reviews with a sentiment associated with a rhetorical rule in the plurality of rhetorical rules in response to a path extracted from the rhetorical structure tree corresponding to the at least one review in the second plurality of reviews matching the path of the rhetorical rule; and train a classifier to identify sentiments and aspects in reviews from the second domain using the second plurality of reviews and the training data, the classifier being stored in the memory for use in classifying sentiments and aspects for additional reviews in the second domain.

9. The system of claim 8, the processor being further configured to:

extract a plurality of paths from the first plurality of rhetorical structure trees, each path in the plurality of paths including at least one span.

10. The system of claim 8, the processor being further configured to:

receive a third plurality of reviews from the second domain using the network interface device;

identify a plurality of sentiments for at least one aspect that is included in the third plurality of reviews based on an output of the classifier; and generate an output using the network interface device including an aspect-level sentiment report that identifies an aggregate sentiment level for the at least one aspect in the third plurality of reviews.

11. The system of claim 8, the processor being further configured to:

parse the third plurality of reviews from the second domain to generate a third plurality of rhetorical structure trees, each rhetorical structure tree in the third plurality of rhetorical structure trees corresponding to one review in the third plurality of reviews, each rhetorical structure tree in the third plurality of rhetorical structure trees including at least one span associated with the predetermined relationship; and filter the output of the classifier to remove a sentiment corresponding to one review in the third plurality of reviews with a path in the rhetorical tree that corresponds to a rhetorical rule that has a probability of the sentiment identified for the one review that is less than a predetermined threshold.

12. The system of claim 8, the processor being further configured to:

identify a predetermined relationship for at least one span in a rhetorical structure tree in the plurality of rhetorical structure trees as a joint relationship, a concession relationship, an elaboration relationship, or an enablement relationship.

13. The system of claim 12, the processor being further configured to:

identify the joint relationship in the at least one span that further includes at least two spans in the rhetorical structure tree.

14. The system of claim 8, wherein the classifier for the second domain is a maximum entropy classifier.

* * * * *